United States Patent [19]

Lin

[11] Patent Number: 5,779,249
[45] Date of Patent: Jul. 14, 1998

[54] SEAT HEIGHT ADJUSTING MEANS OF A BICYCLE

[76] Inventor: Gin-ding Lin, No. 27, Hsiping Lane, Tsengtso Village, Hsiushui Hsiang, Changhua Hsien, Taiwan

[21] Appl. No.: 707,174

[22] Filed: Sep. 3, 1996

[51] Int. Cl.⁶ ............................................. B62K 19/36
[52] U.S. Cl. ............................... 280/287; 297/215.13
[58] Field of Search ............................. 280/279, 287, 280/274, 288.4, 288.1; 297/215.13, 195.1, 256.11; 74/30, 29, 422; 254/427

[56] References Cited

U.S. PATENT DOCUMENTS

| 585,719 | 7/1897 | Sutton | 297/215.13 |
| 2,710,207 | 6/1955 | Mueller | 403/373 |
| 2,712,348 | 7/1955 | Cooper | 297/215.13 |
| 3,486,766 | 12/1969 | Persons | 280/287 |
| 5,382,039 | 1/1995 | Hawker | 297/215.13 |

*Primary Examiner*—Anne Marie Boehler
*Attorney, Agent, or Firm*—Peterson, Wicks, Nemer & Kamrath, P.A.

[57] ABSTRACT

A seat height adjusting device includes a seat post slidably received in a tube, the tube having a slot defined longitudinally therein and the seat post having a rack section defined in a periphery thereof, a C-shaped clamp member securely clamped to the tube and having an extending plate extending from each one of two end sides thereof which are connected by bolts, a pinion rotatably disposed between the two extending plates and engaged to the rack section of the seat post, a crank extending centrally through the pinion and a pin extending through the crank and the pinion such that when rotating the crank, the seat post is moved upwardly or downwardly in the tube by the pinion.

5 Claims, 3 Drawing Sheets

SEAT HEIGHT ADJUSTING MEANS OF A BICYCLE

BACKGROUND OF THE INVENTION

1. Field of the Invention

The present invention relates to a seat height adjusting means of a bicycle and more particularly, to a seat height adjusting means having a crank which is rotated to adjust the seat post.

2. Brief Description of the Prior Art

A bicycle has a frame which includes a seat tube in which a seat post is received. The seat post has one end thereof fixedly connected to a seat and the other end is received in the seat tube which has a securing device to securely clamp the seat post therein such that if a rider wants to adjust the seat post, he/she loosens the securing device first and then pulls or pushes the seat post to a desired position and then re-tightens the securing device. This operation requires time to pull the seat post to a desired position, especially when the seat post is rusted.

The present invention intends to provide a seat height adjusting means which has a crank disposed thereto such that the seat post can be operated by rotating the crank under control so as to mitigate and/or obviate the above-mentioned problems.

SUMMARY OF THE INVENTION

The present invention provides a means for adjusting a seat post and includes a seat post which has a rack section defined in an outer periphery thereof and is received in a tube, the tube having a slot defined longitudinally therein.

A C-shaped clamp member has a passage defined longitudinally therein and two end sides, each one of the two end sides having an extending plate extending therefrom.

A pinion is received between the two extending plates and a crank extends through the two extending plates and is fixedly connected to a center of the pinion. The tube is securely clamped in the passage and the pinion is engaged with the rack section of the seat post via the slot.

It is an object of the present invention to provide a means for adjusting a seat, the seat can be adjusted by rotating a crank disposed to the means.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
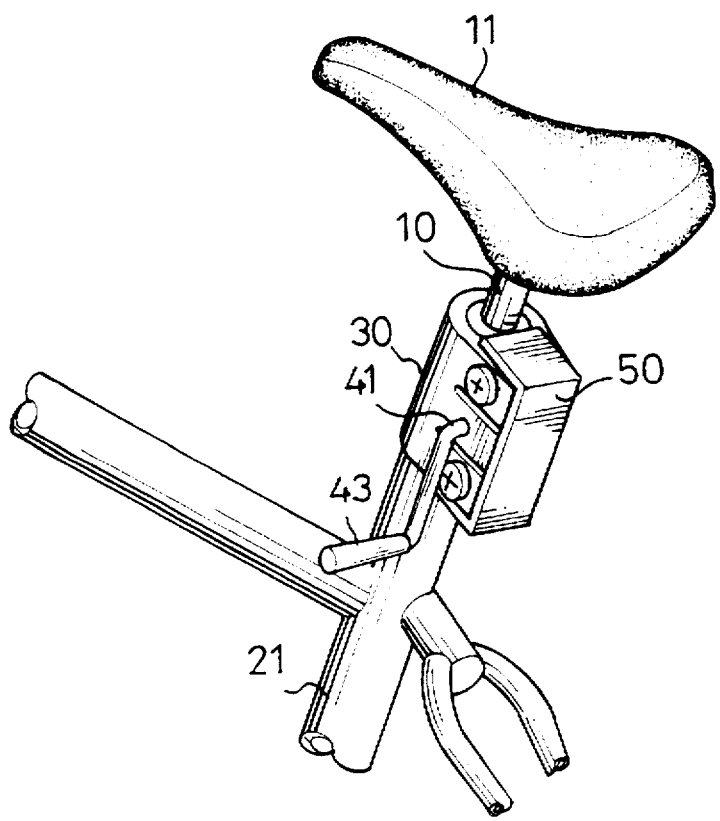
FIG. 1 is a perspective view of an adjustable seat post in accordance with the present invention.
Figure 2:
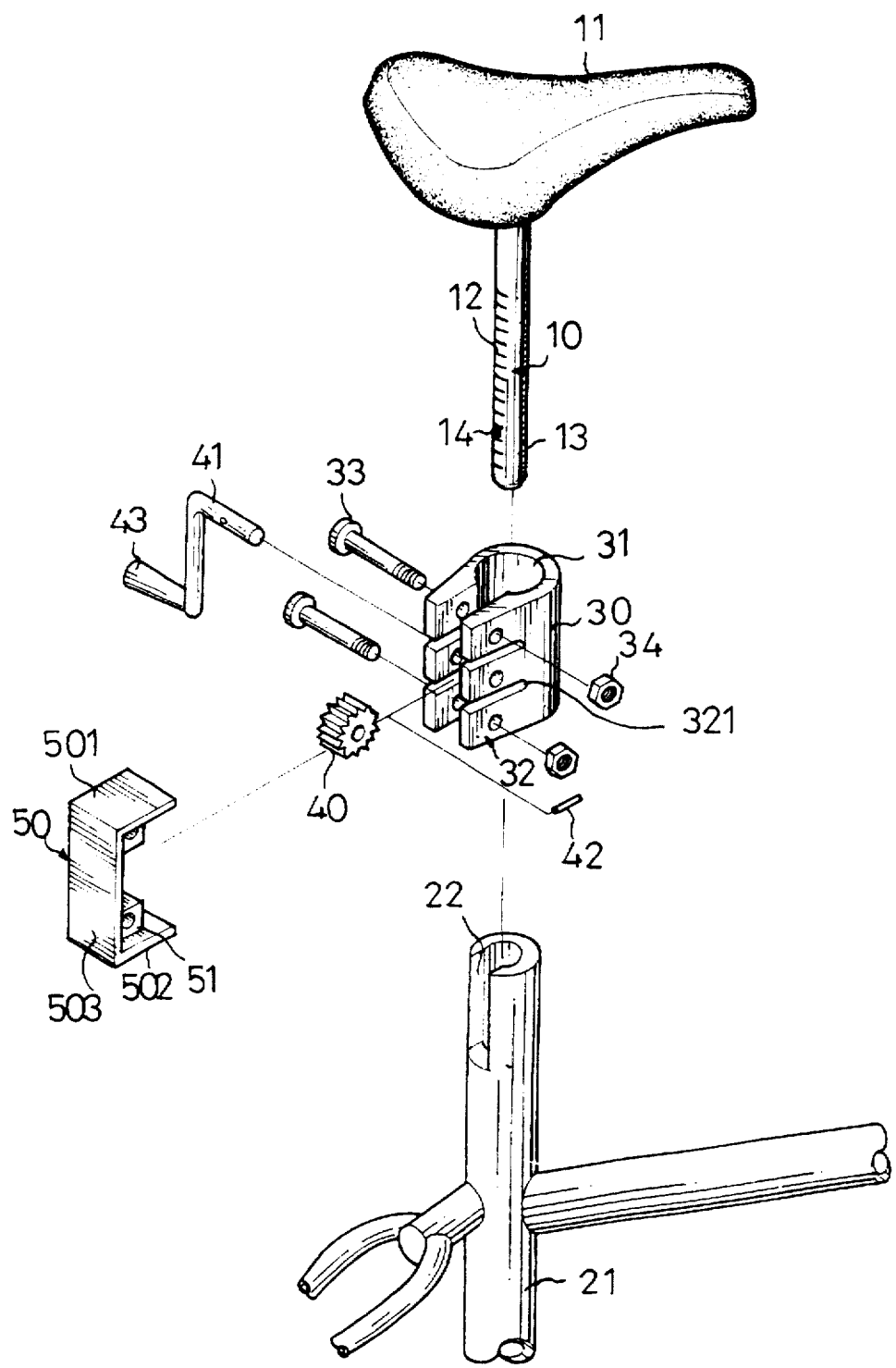
FIG. 2 is an exploded view of the adjustable seat post in accordance with the present invention.
Figure 3:
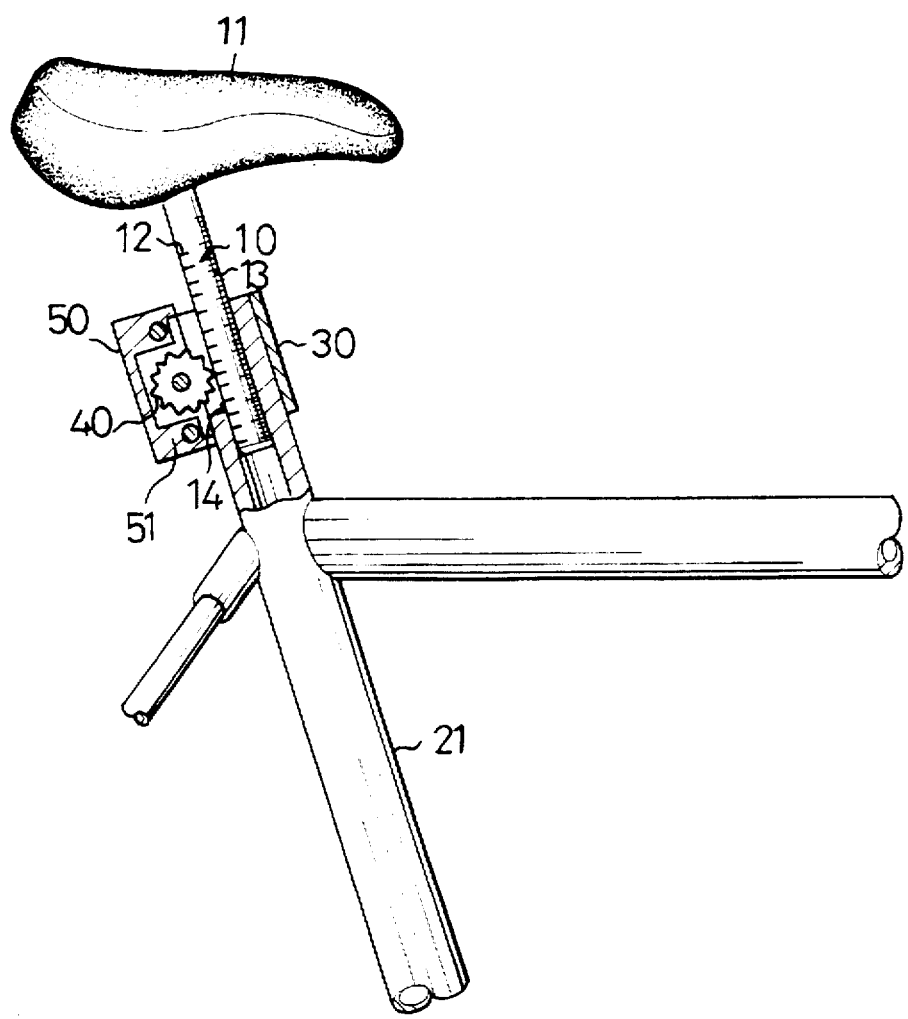
FIG. 3 is a side elevational view, partly in section, of the adjustable seat post.

Referring to FIGS. 1 through 3, a seat height adjusting means of a bicycle in accordance with the present invention generally includes a seat post 10 and a seat 11 is disposed to an upper end of the seat post 10. The seat post 10 has a rack section 12 defined in an outer periphery thereof and a plurality of height graduations 13 are marked on the outer periphery along a longitudinal direction of the seat post 10. The seat post 10 has a stop 14 extending laterally therefrom and the stop 14 is located beneath a lower end of the height graduations 13. A seat tube 21 of the bicycle has an upper open end which has a slot 22 defined longitudinally therein. The seat post 10 is received in the tube 21 via the upper open end thereof.

A clamp member 30 is a substantially C-shaped member and has a passage 31 defined longitudinally therein such that the seat post 10 is received in the seat tube 21 and is clamped within the passage 31. The clamp member 30 has two end sides and each one of the two end sides has an extending plate 32 extending therefrom. Each of the extending plates 32 has two slits 321 defined transversely therein so as to divide each of the extending plates 321 into three parts, a first part, a second part and a third part. Each of the three parts of each of the extending plates 32 has a hole defined therein such that the two first parts and two third parts are connected by two bolts 33 respectively extending therethrough and are respectively engaged to a nut 34.

A pinion 40 is received between the two second parts and a crank 41 with one end thereof extends through the two second parts and is connected to a center of the pinion 40 by a pin 42, the other end of the crank 41 is a knob 43.

The seat tube 21 and the seat post 10 received in the seat tube 21 are securely clamped in the passage 31 by tightening the bolts 33 and the gear 40 is engaged with the rack section 12 of the seat post 10 via the slot 22. Accordingly, when rotating the operation bar 43 about an axis of the center of the gear 40 will move the seat post 10 upwardly or downwardly. When the seat post 10 is lifted to a height where the stop 14 contacts the pinion 40, the seat post 10 is prevented from ejecting out of the seat tube 21.

A cover 50 is mounted to the clamp member 30 and which is composed of an upper board 501, a lower board 502 and a connecting board 503, each of the upper board 501 and the lower board 502 having a block 51 formed in an inner side thereof. The cover 50 is mounted to the two extending plates 32 with the two blocks 51 respectively being inserted between the two first parts and the two third parts such that an engagement between the pinion 40 and the rack section 12 is covered by the cover 50 to prevent dust and the like entering thererin.

Although the invention has been explained in relation to its preferred embodiment, it is to be understood that many other possible modifications and variations can be made without departing from the spirit and scope of the invention as hereinafter claimed.

What is claimed is:

1. A seat height adjusting means comprising:

a seat post having one end thereof connected to a seat and a rack section defined in an outer periphery of said seat post;

a tube having a first end and a second end which has a slot defined longitudinally therein;

a clamp member having a C-shaped configuration and a passage defined longitudinally therein, said clamp member having two end sides and each one of said two end sides having an extending plate extending therefrom;

a pinion received between said two extending plates and a crank extending through said two extending plates and being fixedly connected to a center of said pinion, and said tube is securely clamped in said passage and said seat post is slidably received in said tube by an engagement between said pinion and said rack section of said seat post via said slot.

2. The means as claimed in claim 1 wherein each of said extending plates has two slits defined transversely therein so as to divide each of said extending plates into a first part, a second part and a third part, said pinion received between said two second parts of said two extending plates and each of said two first parts and said two third parts being connected by a bolt extending respectively therethrough.

3. The means as claimed in claim 1 wherein said crank is connected to said pinion by a pin extending therebetween.

4. The means as claimed in claim 1 wherein the other end of said seat post has a stop extending laterally from said outer periphery of said seat post.

5. The means as claimed in claim 1 wherein said seat post has height graduations marked thereto along a longitudinal direction thereof.

* * * * *